United States Patent Office 3,507,750
Patented Apr. 21, 1970

3,507,750
PROCESS FOR PREPARING MILK COAGULATING ENZYME COMPLEX
Edward D. Murray and Margaret P. Prince, London, Ontario, Canada, assignors to John Labatt Limited, London, Ontario, Canada
No Drawing. Filed Mar. 15, 1967, Ser. No. 623,222
Int. Cl. C12d *13/10;* A23c *19/02*
U.S. Cl. 195—66                           6 Claims

ABSTRACT OF THE DISCLOSURE

A process for producing an enzyme complex of acid and neutral peptidases which is substantially free of alkaline pentidases by cultivating an asporulant mutant of *Bacillus subtilis* in a nutriene medium. The medium can be enriched with L-leucine to adjust the ratio of acid peptidase to neutral peptidase.

BACKGROUND OF THE INVENTION

Field of the invention

This invention relates to a new process for producing a milk-coagulating enzyme complex suitable for use in cheesemaking as a substitute for rennet.

Description of the prior art

The animal enzyme preparation generally extracted from the fourth stomach of suckling calves is colloquially called "rennet." This preparation has long been known for its ability to coagulate milk and its subsequent low proteolysis of the curd so formed. In these two properties rennet stood alone and its success in the manufacture of various types of cheeses and milk desserts is attributable mainly to these properties. However, because the raw material used for the production of this enzyme is the fourth stomach of suckling calves, the supply of the raw material is limited and costly.

In the copending Murray et al. application Ser. No. 598,191 filed Dec. 1, 1966 there is described a new peptidase enzyme complex having high milk coagulating activity and low proteolytic activity which has been found to be an excellent substitute for rennet. This new peptidase enzyme complex contains an acid peptidase and a neutral peptidase while being substantially free from alkaline peptidase. Highly suitable enzyme complexes were obtained from bacteria of the genus Bacillus and particularly from a strain of the species *Bacillus subtilis*.

The bacterium was grown in a nutrient medium to produce an enzyme complex containing an acid peptidase, a neutral peptidase and an alkaline peptidase. However, since the alkaline peptidase is harmful to the preparation of high quality cheese, it was necessary to substantially remove, inhibit or inactivate the alkaline peptidase so that it was negligibly active during the production of the cheese.

It was also sometimes found to be necessary to adjust the ratio of acid to neutral peptidases because insufficient acid peptidase was produced. To obtain a good quality cheese, the ratio of acid peptidase to neutral peptidase should be about 1 part acid peptidase to about 0.5– 5.0 parts neutral peptidase and a ratio of about 1 part acid peptidase to about 2–3 parts neutral peptidase is particularly desirable.

SUMMARY OF THE INVENTION

It has now quite surprisingly been found that if an asporulant mutant of a bacterium of the genus Bacillus is grown in a nutrient medium containing a carbon source, a nitrogen source and inorganic salts, acid and neutral peptidases are selectively grown to the substantial exclusion of alkaline peptidase, and the yield of acid and neutral peptidases is greatly increased over that obtained with previous methods. Moreover, if the medium is enriched with a source of L-leucine, the acid and neutral peptidases are directly obtained in a ratio which is highly suitable for use in the production of cheese.

Thus, the process of this invention permits the direct production of acid and neutral peptidases without the necessity of either balancing the ratio of acid to neutral pentidases or removing, inhibiting or inactivating alkaline peptidase. These advantages, together with the increased yields of acid and neutral peptidases, represent a most important advancement in the art.

DESCRIPTION OF THE PREFERRED EMBODIMENTS

Particularly good results are obtained if the bacterium used is a strain of the species of *Bacillus subtilis*.

The medium used for cultivating the bacteria in accordance with the invention can be any suitable natural or artificial medium provided that it contains at least a carbon source, a nitrogen source and inorganic salts. As the carbon source, there can be used any monosaccharide, disaccharide or polysaccharide which is assimilable by the bacteria, such as fructose, sucrose, lactose and starch. A wide variety of assimilable nitrogen sources can also be used, such as inorganic ammonium salts, amino acids and a variety of protein substances. As examples of inorganic salts there may be mentioned magnesium salts, calcium salts, manganese salts and various phosphates.

A particularly suitable medium according to the invention is one which is low in fermentable nitrogen and carbohydrate, e.g. a medium containing during fermentation not more than about 4% (w./v.) whole wheat bran and about 0.01% (w./v.) calcium chloride.

The L-leucine can be added to the culture medium in the pure form, the racemic form or in a suitable nutrient containing L-leucine. The amount of L-leucine added to the medium can be varied over a wide range but about 0.01% (w./v.) L-leucine has been found to be the optimal amount to be added for maximal beneficial adjustment of the ratio of acid peptidase to neutral peptidase. It will, of course, be appreciated that the L-leucine is required only when adjustment of the ratio of acid peptidase to neutral peptidase is necessary.

Asporulant mutants for use in the invention can be obtained by a variety of known techniques. The asporulant mutants of *Bacillus subtilis* were readily obtained from a parent strain of *Bacillus subtilis* by the use of ultra-violet light or neutral acriflavine as mutagenic agents.

The following examples illustrate the invention, it being understood that they are intended only in an illustrative sense and the invention should not be limited thereby.

Example 1—Production of culture filtrate

An inoculum of *Bacillus subtilis* (parent strain) was prepared by transferring organisms from an agar slant to a sterile seed medium of trypticase soy broth (3.0% w./v.) fortified with calcium chloride (0.01% w./v.) and L-leucine (0.01% w./v.), all adjusted to pH 6.2 with 1.0 N HCl. The seed medium was prepared by dispensing 100 ml. of medium into 300 ml. Erlenmeyer flasks. The inoculated seed preparation was shaken on a rotary shaker (2 inch throw at 125 r.p.m.) for 12 hours at 36° C. and after this incubation period the seed was used on 2% v./v. basis to inoculate a production medium.

The production medium was prepared by using water extractable nutrients from wheat bran. To accomplish this, a slurry of wheat bran (3.0% w./v.) and water was boiled under pressure at 120° C. for 45 minutes. The mixture was then cooled and allowed to settle and the clear supernatant was drawn off and fortified with calcium chloride (0.01% w./v.) and L-leucine (0.01% w./v.). The medium was adjusted with 1.0 N HCl so that after sterilization the final pH was 6.2±0.1.

The inoculated production medium was maintained at 36° C. and stirred at 300 r.p.m. in a fully baffled fermentor of 5.0 liters working volume. Sterile air was added at the rate of 2 liters per minute, and normal liquid antifoaming agents were used to suppress foam. The system was allowed to grow until a maximum level of enzymic activity was reached (judged by milk co-agulation tests), this growth period being generally 12±1 hours. The culture broth was then clarified by centrifugation and/or filtration.

The final yield of each enzymic component in crude culture filtrate is shown in Table I. For comparative purposes data are included for the nonamino acid fortified production medium.

TABLE I

Enzymic components in crude culture filtrate after growth. Activities are expressed as units per ml. of culture filtrate. The ratio is of acid peptidase to neutral peptidase.

| Medium | Acid peptidase | Neutral peptidase | Ratio acid to neutral | Alkaline peptidase |
|---|---|---|---|---|
| Wheat bran+calcium chloride. | 2,000 | 4,740 | 1:2.37 | 1,308 |
| Wheat bran+calcium chloride+L-leucine. | 2,300 | 4,140 | 1:1.80 | 987 |

Example 2—Production of asporgenic mutants by ultra-violet radiation

This method used was essentially as outlined by Takahashi, Journal of Bacteriology, 89, 294–298 (1965). Broth cultures of the parent strain of *Bacillus subtilis* were grown on trypticase soy broth fortified with 0.01% (w./v.) calcium chloride and 0.01% (w./v.) L-leucine. After growth for 12 hours, the cells were aseptically collected by centrifugation. The bacterial pellet was resuspended in sterile distilled water to yield approximately $1 \times 10^{12}$ cells per ml. Aliquots of 5 ml. of this suspension were placed in sterile petri dishes. The petri dishes were then placed 15 centimeters from a 15 watt ultra-violet light source and subjected to ultra-violet irradiation for 30, 60 and 90 seconds. After irradiation, the samples were placed in the dark for 30 minutes and then serially diluted, 0.5 ml. portions of appropriate dilutions were then spread onto agar plates containing the recovery (screening) medium.

The recovery medium employed was the sporulation agar described by Schaeffer, D.Sc. Thesis, 1961, Faculty of Science, University of Paris, Paris, France. This contained normal nutrient agar fortified with 0.025% (w./v.) $MgSO_4 \cdot 7H_2O$, 0.1% (w./v.) KCl, and 0.125% (w./v.) $MnCl_2 \cdot 4H_2O$. The pH of this agar medium was adjusted to 7.0. After autoclaving at 120° C. for 20 minutes, $FeSO_4$ ($10^{-6}$ M final concentration) and $CaCl_2$ ($5 \times 10^{-4}$ M final concentration) were aseptically added to the medium. This medium allowed a colour difference to develop whereby sporulating colonies were white in colour while asporulant (i.e. non-sporulating colonies) were brown in colour. Thus a rapid method for the selection of asporulant mutants was provided.

Example 3—Production of asporgenic mutants by neutral acriflavine

The method used was essentially as outlined by Rogolsky and Slepeckey, Biochem and Biophys Res. Comm. 16 204–208 (1964). Cultures of the parent strain of *Bacillus subtilis* were grown for 12 hours on the previously described fortified medium of trypticase soy broth. Aseptically washed cells from such cultures were used to inoculate a modified Spizizen minimal medium. This later medium contained: 1.4% (w./v.) $K_2HPO_4$, 0.6% (w./v.) $KH_2PO_4$, 0.2% (w./v.) $(NH_4)_2SO_4$, 0.1% (w./v.) $C_6H_5Na_3O_7 \cdot 2H_2O$, 0.02% (w./v.) $MgSO_4 \cdot 7H_2O$, 0.002% yeast extract and .02% peptone to pH 7.6 and autoclaved at 120° C. for 20 minutes. After autoclaving, sterile glucose (0.5% w./v. final concentration) was aseptically added to the medium.

Neutral acriflavine was added to growing cultures in the above minimal medium during the logarithmic phase and final concentrations of this mutogen was 6.0 μgm. per ml. The flasks were allowed to shake for 24 hours after the addition of acriflavine. Serial dilutions were then made and 0.5 ml. of appropriate dilutions were plated onto the recovery medium. Asporulant mutants were isolated as described in Example 2.

Table II outlines the peptidase spectra produced by representative strains of both the parent and asporogenic cultures of *Bacillus subtilis* grown on the wheat bran and calcium chloride medium.

TABLE II

Peptidase spectra produced after 12 hours of growth on the production medium by parent and mutated strains of *Bacillus subtilis*. Activities are expressed as units per ml. of filtrate.

| Organism | Acid peptidase | Neutral peptidase | Alkaline peptidase |
|---|---|---|---|
| *Bacillus subtilis* (parent strain) | 2,000 | 4,740 | 1,308 |
| *Bacillus subtilis* (asporulant strain) | 2,075 | 4,680 | Trace |

Example 4—Production of culture filtrate (using asporulant mutant)

An inoculum of an asporulant strain of *Bacillus subtilis* was prepared by transferring organisms from the agar slant to a sterile seed medium of 3.0% trypticase soy broth (w./v.) fortified with 0.01% calcium chloride (w./v.) and 0.01% L-leucine (w./v.) all adjusted to pH 6.2 with 1.0 N HCl. The seed medium was prepared by dispensing 100 ml. of medium into 300 ml. Erlenmeyer flasks. The inoculated seed preparation was shaken on a rotary shaker (2 inch throw at 125 r.p.m.) for 12 hours at 36° C., after this incubation period the seed was used on a 2% (v./v.) basis to inoculate a production medium.

The production medium was prepared by extracting water soluble nutrients from wheat bran. To accomplish this a 3.0% (w./v.) slurry of wheat bran and water was boiled under pressure at 120° C. for 45 minutes. The mixture was then cooled and allowed to settle, the clear supernatant was drawn off and fortified with 0.01% calcium chloride (w./v.) and 0.01% L-leucine (w./v.). The medium was adjusted with 1.0 N HCl so that after sterilization the final pH was 6.2±0.1.

The inoculated production medium was maintained at 36° C. and stirred at 30 r.p.m. in a baffled fermentor of 7.5 liter total volume. Sterile air was added at the rate of 2 liters per minute and normal liquid antifoaming agents were used to suppress foam. The system was allowed to grow until a maximum level of enzymic activity was reached (judged by milk coagulation tests), this growth period was generally 14±1 hours. The culture broth was then clarified by centrifugation and/or filtration.

Example 5—Production of culture filtrate

A production as outlined in Example 4 was followed with the exception that the production medium was modified so that the amino acid L-leucine was omitted and 0.25% (w./v.) of a preparation from casein available from Delmar Chemical Ltd. under the trademark Totamine was used in its place. All other production medium constituents remained the same. The clarified culture broth was essentially the same as produced in Example 4.

Example 6—Production of culture filtrate

A procedure as outlined in Example 4 was followed with the exception that the production medium was modified so that the amino acid L-leucine was omitted and zein (0.25% w./v.), a protein fraction from maize, was used in its place. All other medium constituents remained the same. The clarified culture broth was essentially the same as produced in Example 4.

A peptidase spectrum produced by a mutated strain of *Bacillus subtilis* was grown on a wheat bran and calcium chloride medium fortified with L-leucine is shown in Table III below.

TABLE III

Peptidase spectrum produced after 12 years of growth on the production medium. Activities are expressed as units per ml. of filtrate.

| | |
|---|---|
| Acid peptidase | 2,350 |
| Neutral peptidase | 4,775 |
| Alkaline peptidase | Trace |

During routine production of the culture filtrate a plateau in product yield was always associated with the onset of sporulation. From Table II it can be observed that although the undesirable alkaline peptidase is greatly suppressed, there is negligible gain in yield of acid and neutral peptidases after 12 hours of growth. However, because sporulation no longer limited the growth period it was possible to continue this period for an additional two hours before a plateau occured in product yield. During this critical period there was an eight fold increase in coagulating activity of elaborated peptidases.

Previously, after 12 hours of growth 0.40 ml. of the crude culture filtrate was required to coagulate 10.0 ml. or acidified skim milk at 36° C. The extended growth phase associated with the asporulant strain provided crude culture filtrate of increased coagulating activity and 0.05 ml. of filtrate was sufficient to coagulate 10.0 ml. of milk under the above conditions.

Example 7—Manufacture of cheeses (pilot scale)

Whole pasteurized milk (16 Imp. gals.) was heated to 31±1° C. When this temperature was reached, 0.5 to 1.0% cheese starter culture was added and the mixture was stirred thoroughly. The starter organisms were allowed to grow until the acidity of the milk reached 0.17% as lactic acid. At his time 15 ml. of concentrated enzyme complex according to this invention were added. The mixture was stirred thoroughly and allowed to remain, covered and unagitated, in a jacketed vessel for 25–30 minutes.

The coagulated milk was then cut with a curd knife and the normal techniques of cheddar cheese manufacture were followed. After pressing, the final cheese was placed in a ripening cabinet at a temperature of 12±2° C. with a relative humidity of 70–75%. The cheeses were allowed to ripen for periods of one to 18 months and evaluation of the cheeses at various time intervals showed them to be of normal cheddar flavour and quality.

Example 8—Manufacture of cheeses (semi-commercial scale)

A procedure as outlined in Example 7 was followed with the exception that 100 Imp. gals. of whole pasteurized milk were coagulated with three fluid ounces of concentrated enzyme complex according to the invention. During the cheddaring process it was observed that the curd possessed a highly desirable smooth silky texture and also a beneficial type of curd breakdown occurred. After pressing, the yield of cheese was calculated and it was found that no significant differences existed between the above cheeses and animal rennet controls. Cheeses were ripened for 90 days and those produced with the enzyme complex possessed normal cheddar flavour and quality, when compared to control cheeses.

What we claim as our invention is:

1. A process for producing an enzyme complex of acid and neutral peptidases containing not more than trace amounts of alkaline peptidase, said complex having high milk coagulating activity and low proteolytic activity which comprises inoculating a medium containing sources of carbohydrate, nitrogenous material, essential trace nutrients and inorganic salts with an asporulant mutant of *Bacillus substilis*, allowing growth to take place until a substantial amount of the enzyme complex is produced and thereafter extracting the enzymes formed.

2. A process according to claim 1 wherein the medium is low in fermentable nitrogen and carbohydrate.

3. A process according to claim 2 wherein the medium is enriched with about 0.01% L-leucine.

4. A process according to claim 2 wherein the medium is a wheat bran medium.

5. A process according to claim 4 wherein the medium is enriched with calcium ions.

6. A process according to claim 5 wherein the medium is enriched with manganese, magnesium and phosphate.

References Cited

UNITED STATES PATENTS 3,212,905   10/1965   Arima et al. _____ 99—116

FOREIGN PATENTS 565,788   11/1944   Great Britain.

LIONEL M. SHAPIRO, Primary Examiner

U.S. Cl. X.R.

99—116